(12) United States Patent
Zhang

(10) Patent No.: US 10,700,839 B2
(45) Date of Patent: Jun. 30, 2020

(54) METHOD AND DEVICE IN UE AND BASE STATION USED FOR DYNAMIC SCHEDULING

(71) Applicant: Shanghai Langbo Communication Technology Company Limited, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 38 days.

(21) Appl. No.: 16/027,626

(22) Filed: Jul. 5, 2018

(65) Prior Publication Data
US 2019/0013919 A1    Jan. 10, 2019

(30) Foreign Application Priority Data
Jul. 8, 2017    (CN) .......................... 2017 1 0553683

(51) Int. Cl.
*H04L 5/00* (2006.01)
*H04W 72/12* (2009.01)

(52) U.S. Cl.
CPC ....... *H04L 5/0053* (2013.01); *H04W 72/1231* (2013.01); *H04L 5/0007* (2013.01); *H04L 5/0073* (2013.01); *H04L 5/0091* (2013.01)

(58) Field of Classification Search
CPC .......... H04J 11/00; H04L 5/00; H04L 5/0007; H04L 5/0041; H04L 5/0042; H04L 5/0044; H04L 5/0046; H04L 5/0053; H04L 5/0073; H04L 5/0083; H04L 5/0091; H04L 5/0094; H04L 27/3483; H04W 72/042; H04W 72/0453; H04W 72/048; H04W 72/1231; H04W 88/08
See application file for complete search history.

(56) References Cited

U.S. PATENT DOCUMENTS

| | | |
|---|---|---|
| 9,560,655 B2 * | 1/2017 | Von Elbwart et al. |
| 2010/0034312 A1 * | 2/2010 | Muharemovic et al. |
| 2012/0282936 A1 * | 11/2012 | Gao et al. |

* cited by examiner

*Primary Examiner* — Marsha D Banks Harold
*Assistant Examiner* — Dharmesh J Patel
(74) *Attorney, Agent, or Firm* — Maschoff Brennan

(57) ABSTRACT

A method and a device in a User Equipment and a base station are provided. The UE receives first information and monitors a first signaling in M Resource Element (RE) sets. The first information determines the M RE sets. The UE assumes that P modulation symbol groups are one-to-one mapped to P RE sets of the M RE sets. One blind detection for the first signaling is performed on the P RE sets. Modulation symbols obtained by modulating the bits in a first bit sequence constitute a first modulation symbol set sequentially. The bits in the first bit sequence are sequentially arranged according to an output of a channel encoder. The first modulation symbol set is successively divided into the P modulation symbol groups, each consisting of X modulation symbols. Relative positions of the P RE sets in frequency domain are related to at least one of {M, X}.

20 Claims, 12 Drawing Sheets

One modulation symbol group    Order of writing into target matrix    Order of reading from target matrix

METHOD AND DEVICE IN UE AND BASE STATION USED FOR DYNAMIC SCHEDULING

CROSS REFERENCE TO RELATED APPLICATION

This application claims the priority benefit of Chinese Patent Application Serial Number 201710553683.7, filed on Jul. 8, 2017, the full disclosure of which is incorporated herein by reference.

BACKGROUND

Technical Field

The present disclosure relates to transmission methods and devices in wireless communication systems, and in particular to transmission schemes and devices for dynamically scheduling signaling.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary session decided to conduct the study of New Radio (NR). The work item of NR was approved at the 3GPP RAN #75 session to standardize the NR.

In order to adapt to diversified application scenarios and meet different requirements, the 3GPP RAN1 Adhoc #1706 session reached a consensus on the resource unit for Physical Downlink Control Channel (PDCCH) in NR. In one resource unit, a User Equipment (UE) can assume that precoding is the same and thus can adopt the same channel estimation. A resource unit is called a Resource Element Group (REG) bundle in present discussions. The number of REs included in one REG bundle is related to the number of multicarrier symbols configured to transmit the PDCCH, or is configured by the network.

SUMMARY

In order to harvest sufficient frequency diversity gains and to reduce impacts caused by bursty errors, the existing LTE PDCCH adopts REG-based interleaving. The interleaving is realized based on an interleaving matrix having a fixed number (32) of columns. In addition, after the interleaving, a method of cyclic shift is further employed to randomize the impacts resulted from the interference of neighboring cells. In NR systems far greater than the LTE bandwidth, frequency diversity gains are more significant. It is therefore necessary to support the interleaving of the PDCCH in NR. On the other hand, due to the limit of the REG bundle, the minimum possible unit for the interleaver of the PDCCH in NR can be an REG bundle only, rather than an REG Furthermore, since the number of REs included in the REG bundle is far greater than the number of REs in the REG of the LTE PDCCH, meanwhile the bandwidth of the PDCCH in NR is far greater than the bandwidth that can be occupied by the PDCCH, the interleaver design for the PDCCH in LTE cannot meet the design requirement of NR.

In view of the interleaver design for the PDCCH in NR, the present disclosure provides a solution. It should be noted that embodiments in the UE of the present disclosure and the characteristics in the embodiments may be applied to the base station if no conflict is incurred, and vice versa. Further, the embodiments of the present disclosure and the characteristics in the embodiments may be mutually combined if no conflict is incurred.

The present disclosure provides a method in a UE for wireless communication. The method includes the following steps:

receiving first information; and monitoring a first signaling in M RE sets.

Herein, the first information is used for determining the M RE sets, a monitor of the first signaling assumes that P modulation symbol groups are one-to-one mapped to P RE sets, the P RE sets are P RE sets of the M RE sets, and one blind detection for the first signaling is performed on the P RE sets; modulation symbols obtained by modulating the bits in a first bit sequence constitute a first modulation symbol set sequentially, wherein the bits in the first bit sequence are sequentially arranged according to an output of a channel encoder; the first modulation symbol set is divided into the P modulation symbol groups successively from the front to the rear, and each modulation symbol group of the P modulation symbol groups consists of X modulation symbols; and relative positions of the P RE sets in frequency domain are related to at least one of {M, X}, wherein M is a positive integer, P is a positive integer not greater than M, and X is a positive integer.

According to one aspect of the present disclosure, the above method is characterized in that: the monitor of the first signaling assumes that the P modulation symbol groups are P consecutive groups of M modulation symbol groups sequentially arranged, the M modulation symbol groups sequentially arranged are interleaved and subsequently constitute a first symbol group sequence sequentially, and the modulation symbol groups in the first symbol group sequence are mapped, starting from a target RE set, to the M RE sets which are arranged in the order of frequency, wherein the target RE set is one of the M RE sets, and the interleaving includes the following:

the M modulation symbol groups sequentially arranged are mapped into a target interleaving matrix sequentially according to the order of rows first and then columns, as M matrix elements; and the elements in the target interleaving matrix are rearranged and then read out sequentially according to the order of columns first and then rows to obtain the first symbol group sequence.

Herein, at least one of {M, X} is used for determining the number of columns of the target interleaving matrix, and relative positions of the P RE sets in frequency domain are related to the number of columns of the target interleaving matrix.

According to one aspect of the present disclosure, the above method is characterized in that: the target interleaving matrix includes R rows and C columns, the M modulation symbol groups and J blank modulation symbol groups together are arranged into the target interleaving matrix, the sum of M and J is equal to the product of R and C, wherein R is a positive integer, C is a positive integer, and J is a non-negative integer.

According to one aspect of the present disclosure, the above method is characterized in that: the target RE set is related to at least one of {a feature ID of a transmitter of the first signaling, a feature ID of the monitor of the first signaling, a time-frequency position of an RE in the M RE sets}.

According to one aspect of the present disclosure, the above method is characterized in that: a first RE set is one of the M RE sets, the monitor of the first signaling assumes that all REs in the first RE set adopt the same precoding, and the monitor of the first signaling cannot assume that the REs in the first RE set and the REs other than the first RE set both adopt the same precoding.

According to one aspect of the present disclosure, the above method is characterized in that: a maximum of Y detections are performed for the first signaling in the M RE sets, at least one detection of the Y detections is performed on the P RE sets, Y is a positive integer, and the first signaling is a physical layer signaling.

According to one aspect of the present disclosure, the above method further includes:

receiving second information.

Herein, the second information is used for determining X.

The present disclosure provides a method in a base station device for wireless communication. The method includes the following steps:

transmitting first information; and transmitting a first signaling in M RE sets.

Herein, the first information is used for determining the M RE sets, a monitor of the first signaling assumes that P modulation symbol groups are one-to-one mapped to P RE sets, the P RE sets are P RE sets of the M RE sets, and one blind detection for the first signaling is performed on the P RE sets; modulation symbols obtained by modulating the bits in a first bit sequence constitute a first modulation symbol set sequentially, wherein the bits in the first bit sequence are sequentially arranged according to an output of a channel encoder; the first modulation symbol set is divided into the P modulation symbol groups successively from the front to the rear, and each modulation symbol group of the P modulation symbol groups consists of X modulation symbols; and relative positions of the P RE sets in frequency domain are related to at least one of {M, X}, wherein M is a positive integer, P is a positive integer not greater than M, and X is a positive integer.

According to one aspect of the present disclosure, the above method is characterized in that: the monitor of the first signaling assumes that the P modulation symbol groups are P consecutive groups of M modulation symbol groups sequentially arranged, the M modulation symbol groups sequentially arranged are interleaved and subsequently constitute a first symbol group sequence sequentially, and the modulation symbol groups in the first symbol group sequence are mapped, starting from a target RE set, to the M RE sets which are arranged in the order of frequency, wherein the target RE set is one of the M RE sets, and the interleaving includes the following:

the M modulation symbol groups sequentially arranged are mapped into a target interleaving matrix sequentially according to the order of rows first and then columns, as M matrix elements; and the elements in the target interleaving matrix are rearranged and then read out sequentially according to the order of columns first and then rows to obtain the first symbol group sequence.

Herein, at least one of {M, X} is used for determining the number of columns of the target interleaving matrix, and relative positions of the P RE sets in frequency domain are related to the number of columns of the target interleaving matrix.

According to one aspect of the present disclosure, the above method is characterized in that: the target interleaving matrix includes R rows and C columns, the M modulation symbol groups and J blank modulation symbol groups together are arranged into the target interleaving matrix, the sum of M and J is equal to the product of R and C, wherein R is a positive integer, C is a positive integer, and J is a non-negative integer.

According to one aspect of the present disclosure, the above method is characterized in that: the target RE set is related to at least one of {a feature ID of a transmitter of the first signaling, a feature ID of the monitor of the first signaling, a time-frequency position of an RE in the M RE sets}.

According to one aspect of the present disclosure, the above method is characterized in that: a first RE set is one of the M RE sets, the monitor of the first signaling assumes that all REs in the first RE set adopt the same precoding, and the monitor of the first signaling cannot assume that the REs in the first RE set and the REs other than the first RE set both adopt the same precoding.

According to one aspect of the present disclosure, the above method is characterized in that: a maximum of Y detections are performed for the first signaling in the M RE sets, at least one detection of the Y detections is performed on the P RE sets, Y is a positive integer, and the first signaling is a physical layer signaling.

According to one aspect of the present disclosure, the above method further includes:

transmitting second information.

Herein, the second information is used for determining X.

The present disclosure provides a UE for wireless communication. The UE includes:

a first receiver module, to receive first information; and a second receiver module, to monitor a first signaling in M RE sets.

Herein, the first information is used for determining the M RE sets, the monitor of the first signaling assumes that P modulation symbol groups are one-to-one mapped to P RE sets, the P RE sets are P RE sets of the M RE sets, and one blind detection for the first signaling is performed on the P RE sets; modulation symbols obtained by modulating the bits in a first bit sequence constitute a first modulation symbol set sequentially, wherein the bits in the first bit sequence are sequentially arranged according to an output of a channel encoder; the first modulation symbol set is divided into the P modulation symbol groups successively from the front to the rear, and each modulation symbol group of the P modulation symbol groups consists of X modulation symbols; and relative positions of the P RE sets in frequency domain are related to at least one of {M, X}, wherein M is a positive integer, P is a positive integer not greater than M, and X is a positive integer.

According to one aspect of the present disclosure, the above UE is characterized in that: the monitor of the first signaling assumes that the P modulation symbol groups are P consecutive groups of M modulation symbol groups sequentially arranged, the M modulation symbol groups sequentially arranged are interleaved and subsequently constitute a first symbol group sequence sequentially, and the modulation symbol groups in the first symbol group sequence are mapped, starting from a target RE set, to the M RE sets which are arranged in the order of frequency, wherein the target RE set is one of the M RE sets, and the interleaving includes the following:

the M modulation symbol groups sequentially arranged are mapped into a target interleaving matrix sequentially according to the order of rows first and then columns, as M matrix elements; and the elements in the target interleaving matrix are rearranged and then read out sequentially according to the order of columns first and then rows to obtain the first symbol group sequence.

Herein, at least one of {M, X} is used for determining the number of columns of the target interleaving matrix, and relative positions of the P RE sets in frequency domain are related to the number of columns of the target interleaving matrix.

According to one aspect of the present disclosure, the above UE is characterized in that: the target interleaving matrix includes R rows and C columns, the M modulation symbol groups and J blank modulation symbol groups together are arranged into the target interleaving matrix, the sum of M and J is equal to the product of R and C, wherein R is a positive integer, C is a positive integer, and J is a non-negative integer.

According to one aspect of the present disclosure, the above UE is characterized in that: the target RE set is related to at least one of {a feature ID of a transmitter of the first signaling, a feature ID of the monitor of the first signaling, a time-frequency position of an RE in the M RE sets}.

According to one aspect of the present disclosure, the above UE is characterized in that: a first RE set is one of the M RE sets, the monitor of the first signaling assumes that all REs in the first RE set adopt the same precoding, and the monitor of the first signaling cannot assume that the REs in the first RE set and the REs other than the first RE set both adopt the same precoding.

According to one aspect of the present disclosure, the above UE is characterized in that: a maximum of Y detections are performed for the first signaling in the M RE sets, at least one detection of the Y detections is performed on the P RE sets, Y is a positive integer, and the first signaling is a physical layer signaling.

According to one aspect of the present disclosure, the above UE is characterized in that: the first receiver module further receives second information, and the second information is used for determining X.

The present disclosure provides a base station device for wireless communication. The base station device includes:
a first transmitter module, to transmit first information; and
a second transmitter module, to transmit a first signaling in M RE sets.

Herein, the first information is used for determining the M RE sets, a monitor of the first signaling assumes that P modulation symbol groups are one-to-one mapped to P RE sets, the P RE sets are P RE sets of the M RE sets, and one blind detection for the first signaling is performed on the P RE sets; modulation symbols obtained by modulating the bits in a first bit sequence constitute a first modulation symbol set sequentially, wherein the bits in the first bit sequence are sequentially arranged according to an output of a channel encoder; the first modulation symbol set is divided into the P modulation symbol groups successively from the front to the rear, and each modulation symbol group of the P modulation symbol groups consists of X modulation symbols; and relative positions of the P RE sets in frequency domain are related to at least one of {M, X}, wherein M is a positive integer, P is a positive integer not greater than M, and X is a positive integer.

According to one aspect of the present disclosure, the above base station device is characterized in that: the monitor of the first signaling assumes that the P modulation symbol groups are P consecutive groups of M modulation symbol groups sequentially arranged, the M modulation symbol groups sequentially arranged are interleaved and subsequently constitute a first symbol group sequence sequentially, and the modulation symbol groups in the first symbol group sequence are mapped, starting from a target RE set, to the M RE sets which are arranged in the order of frequency, wherein the target RE set is one of the M RE sets, and the interleaving includes the following:

the M modulation symbol groups sequentially arranged are mapped into a target interleaving matrix sequentially according to the order of rows first and then columns, as M matrix elements; and the elements in the target interleaving matrix are rearranged and then read out sequentially according to the order of columns first and then rows to obtain the first symbol group sequence.

Herein, at least one of {M, X} is used for determining the number of columns of the target interleaving matrix, and relative positions of the P RE sets in frequency domain are related to the number of columns of the target interleaving matrix.

According to one aspect of the present disclosure, the above base station device is characterized in that: the target interleaving matrix includes R rows and C columns, the M modulation symbol groups and J blank modulation symbol groups together are arranged into the target interleaving matrix, the sum of M and J is equal to the product of R and C, wherein R is a positive integer, C is a positive integer, and J is a non-negative integer.

According to one aspect of the present disclosure, the above base station device is characterized in that: the target RE set is related to at least one of {a feature ID of a transmitter of the first signaling, a feature ID of the monitor of the first signaling, a time-frequency position of an RE in the M RE sets}.

According to one aspect of the present disclosure, the above base station device is characterized in that: a first RE set is one of the M RE sets, the monitor of the first signaling assumes that all REs in the first RE set adopt the same precoding, and the monitor of the first signaling cannot assume that the REs in the first RE set and the REs other than the first RE set both adopt the same precoding.

According to one aspect of the present disclosure, the above base station device is characterized in that: a maximum of Y detections are performed for the first signaling in the M RE sets, at least one detection of the Y detections is performed on the P RE sets, Y is a positive integer, and the first signaling is a physical layer signaling.

According to one aspect of the present disclosure, the above base station device is characterized in that: the first transmitter module further transmits second information, and the second information is used for determining X.

In one embodiment, compared with the interleaver design for the PDCCH in LTE, the present disclosure mainly has the following technical benefits.

According to the present disclosure, the interleaved PDCCH pattern is related to the number of REG bundles in a resource pool configured to transmit the PDCCH and the number of REs in the REG bundle. It can be guaranteed that the REG bundles constituting the PDCCH, after being interleaved, are more evenly distributed in frequency domain resources compared with the interleaving method in LTE. The frequency diversity gain is maximized.

According to the present disclosure, when distributed and localized PDCCHs share the same resource pool, the even distribution of REG bundles can effectively reduce the blocking probability during the PDCCH transmission of multiple UEs and improve the capacity of the control channel.

According to the present disclosure, compared with the cyclic shift performed only based on a cell ID in LTE, the cyclic shift performed based on the time-frequency position of the resource pool or the UE ID after the REG bundle-based interleaving can more flexibly control the randomization of interference, thereby further improving the link performance of the PDCCH transmission.

BRIEF DESCRIPTION OF THE DRAWINGS

Other features, purposes and advantages of the present disclosure will become more apparent from the detailed description of non-restrictive embodiments taken in conjunction with the following drawings.

DESCRIPTION OF THE EMBODIMENTS

The technical scheme of the present disclosure is described below in further detail in conjunction with the drawings. It should be noted that the embodiments in the present disclosure and the characteristics of the embodiments may be arbitrarily combined if there is no conflict.

Embodiment 1

Figure 1:
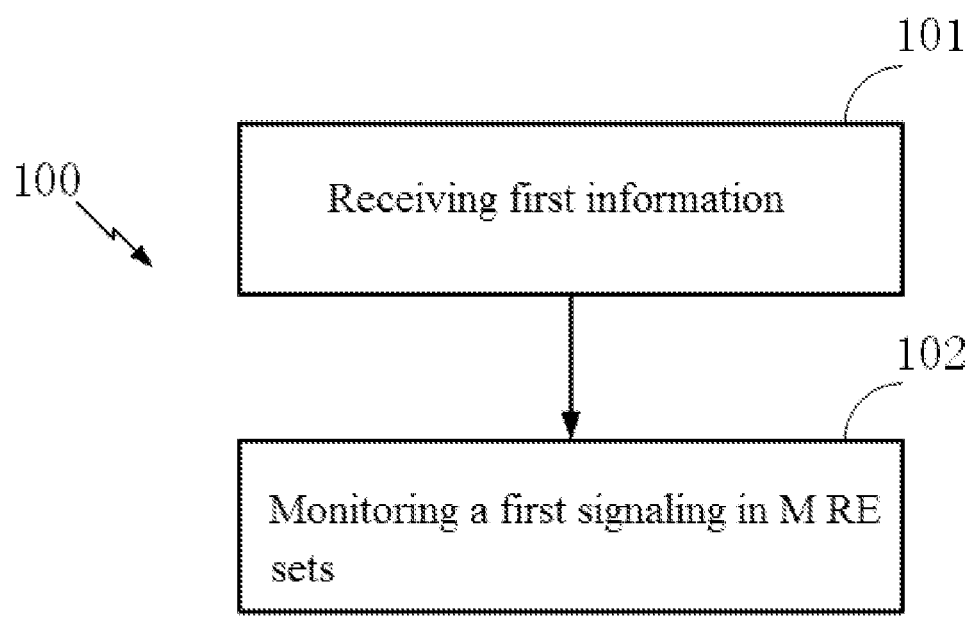
FIG. 1 is a flowchart illustrating the transmission of first information and a first signaling according to one embodiment of the present disclosure.

Embodiment 1 illustrates an example of a flowchart of the transmission of first information and a first signaling according to one embodiment of the present disclosure, as shown in FIG. 1. In FIG. 1, each box represents one step. In Embodiment 1, the UE in the present disclosure first receives first information and then monitors a first signaling in M RE sets, wherein the first information is used for determining the M RE sets, a monitor of the first signaling assumes that P modulation symbol groups are one-to-one mapped to P RE sets, the P RE sets are P RE sets of the M RE sets, and one blind detection for the first signaling is performed on the P RE sets; modulation symbols obtained by modulating the bits in a first bit sequence constitute a first modulation symbol set sequentially, wherein the bits in the first bit sequence are sequentially arranged according to an output of a channel encoder; the first modulation symbol set is divided into the P modulation symbol groups successively from the front to the rear, and each modulation symbol group of the P modulation symbol groups consists of X modulation symbols; and relative positions of the P RE sets in frequency domain are related to at least one of {M, X}, wherein M is a positive integer, P is a positive integer not greater than M, and X is a positive integer.

In one embodiment, the first information is high-layer information.

In one embodiment, the first information is carried through a Radio Resource Control (RRC) signaling.

In one embodiment, the first information is one Information Element (IE) of the RRC signaling.

In one embodiment, the first information is physical layer information.

In one embodiment, the first information is transmitted through Downlink Control Information (DCI).

In one embodiment, the first signaling is a physical layer signaling.

In one embodiment, the first signaling is a DCI.

In one embodiment, the first signaling is one field of the DCI.

In one embodiment, the first signaling is transmitted through a PDCCH.

In one embodiment, the first signaling is transmitted through a New Radio Physical Downlink Control Channel (NR-PDCCH).

In one embodiment, each RE set of the M RE sets includes X REs.

In one embodiment, X is equal to one of {18,27,54,20, 30,60}.

In one embodiment, X is related to the number of multicarrier symbols occupied by the M RE sets in time domain.

In one embodiment, none of the M RE sets includes a Reference Signal (RS) RE.

In one embodiment, each RE set of the M RE sets includes the same number of RS REs.

In one embodiment, any two RE sets of the M RE sets are orthogonal, wherein the two RE sets being orthogonal refers to that there is no RE belonging to both the two RE sets.

In one embodiment, each RE set of the M RE sets consists of one of {2,3,6} REGs, wherein each REG occupies one multicarrier symbol in time domain and occupies one PRB in frequency domain.

In one embodiment, each RE in the M RE sets occupies one multicarrier symbol in time domain and occupies one subcarrier in frequency domain.

In one embodiment, the M RE sets occupy one of {1,2,3} multicarrier symbols in time domain.

In one embodiment, the M RE sets are discrete in frequency domain.

In one embodiment, the M RE sets are consecutive in frequency domain.

In one embodiment, the first information is used by the UE to determine the M RE sets.

In one embodiment, the first information indicates the M RE sets.

In one embodiment, the blind detection for the first signaling on the P RE sets is realized through the validation of a Radio Network Temporary Identity (RNTI).

In one embodiment, M is greater than 1 and P is greater than 1.

In one embodiment, all modulation symbols in the first modulation symbol set are based on the same modulation scheme.

In one embodiment, each modulation symbol in the first modulation symbol set is modulated based on Quadrature Phase Shift Keying (QPSK).

In one embodiment, each modulation symbol in the first modulation symbol set is modulated based on 16 Quadrature Amplitude Modulation (QAM).

In one embodiment, the channel encoder is based on polar coding.

In one embodiment, the channel encoder is based on convolutional coding.

In one embodiment, the channel encoder is based on a code rate of ⅓ tail-biting convolutional coding.

In one embodiment, the bits in the first bit sequence are an output of rate matching of the output of the channel encoder.

In one subembodiment, the rate matching includes one of {Repetition, Puncturing, Shortening}.

In one embodiment, the relative positions of the P RE sets in frequency domain refer to a pattern in frequency domain of the P RE sets sequentially corresponding to the P modulation symbol groups.

In one embodiment, the relative positions of the P RE sets in frequency domain refer to distances between the positions in frequency domain of any two adjacent RE sets of the P RE sets sequentially corresponding to the P modulation symbol groups.

In one embodiment, the relative positions of the P RE sets in frequency domain refer to a minimum value of the distances between the positions in frequency domain of any two adjacent RE sets of the P RE sets sequentially corresponding to the P modulation symbol groups.

In one embodiment, the relative positions of the P RE sets in frequency domain refer to the interleaving depth of an interleaver, wherein the interleaver will change the index sequence of the M RE sets which are indexed by frequencies, and the interleaving depth refers to a minimum distance of two adjacent elements after the interleaving.

In one embodiment, the P RE sets are consecutive in frequency domain.

In one embodiment, the P RE sets are discrete in frequency domain.

Embodiment 2

Figure 2:
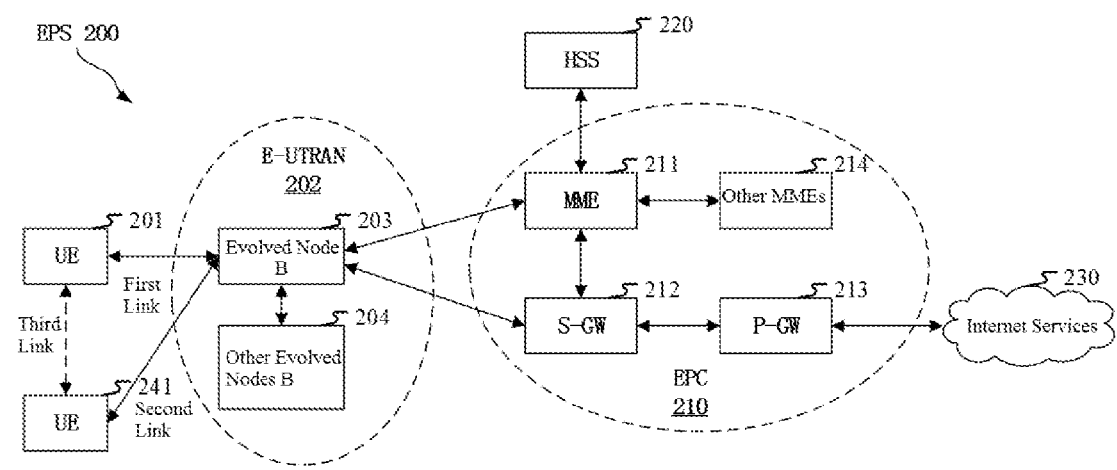
FIG. 2 is a diagram illustrating a network architecture according to one embodiment of the present disclosure.

Embodiment 2 illustrates an example of a diagram of a network architecture according to the present disclosure, as shown in FIG. 2. FIG. 2 is a diagram illustrating a system network architecture 200 of NR 5G, Long-Term Evolution (LTE), Long-Term Evolution Advanced (LTE-A). The NR 5G or LTE network architecture 200 may be called an Evolved Packet System (EPS) 200. The EPS 200 may include one or more UEs 201, an NG-RAN 202, an Evolved Packet Core/5G-Core Network (EPC/5G-CN) 210, a Home Subscriber Server (HSS) 220 and an Internet Service 230. Herein, the EPS may be interconnected with other access networks. For simple description, the entities/interfaces are not shown. As shown in FIG. 2, the EPS provides packet switching services. Those skilled in the art are easy to understand that various concepts presented throughout the present disclosure can be extended to networks providing circuit switching services or other cellular networks. The NG-RAN includes an NR node B (gNB) 203 and other evolved nodes B (gNBs) 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or other appropriate terms. The gNB 203 is connected to the EPC/5G-CN 210 via an S1/NG interface. The EPC/5G-CN 210 includes an MME/AMF/UPF 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IP IMSs) and Packet switching Streaming Services (PSSs).

In one embodiment, the UE 201 corresponds to the UE of the present disclosure.

In one embodiment, the gNB 203 corresponds to the base station of the present disclosure.

In one embodiment, the UE 201 supports blind detections of downlink control information.

In one embodiment, the UE 201 supports an interleaving transmission of a PDCCH.

In one embodiment, the gNB 203 supports an interleaving transmission of a PDCCH.

Embodiment 3

Figure 3:
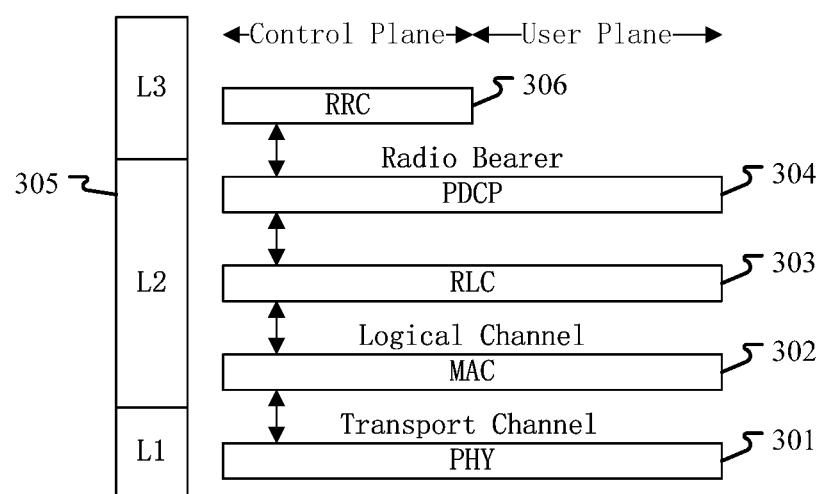
FIG. 3 is a diagram illustrating a radio protocol architecture of a user plane and a control plane according to one embodiment of the present disclosure.

Embodiment 3 is a diagram illustrating an embodiment of a radio protocol architecture of a user plane and a control plane according to the present disclosure, as shown in FIG. 3. FIG. 3 is a diagram illustrating an embodiment of a radio protocol architecture of a user plane and a control plane. In FIG. 3, the radio protocol architecture of a UE and a gNB is represented by three layers, which are a layer 1, a layer 2 and a layer 3 respectively. The layer 1 (L1) 301 is the lowest layer and performs signal processing functions of each PHY layer. The layer 1 is called PHY 301 in this paper. The layer 2 (L2) 305 is above the PHY 301, and is in charge of the link between the UE and the gNB via the PHY 301. In the user plane, the L2 305 includes a Medium Access Control (MAC) sublayer 302, a Radio Link Control (RLC) sublayer 303, and a Packet Data Convergence Protocol (PDCP) sublayer 304. All the three sublayers terminate at the gNB of the network side. Although not described in FIG. 3, the UE may include several higher layers above the L2 305, such as a network layer (i.e. IP layer) terminated at a P-GW of the network side and an application layer terminated at the other side of the connection (i.e. a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a lost packet to as to compensate the disordered receiving caused by Hybrid Automatic Repeat Request (HARQ). The MAC sublayer 302 provides multiplexing between logical channels and transport channels. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also includes a Radio Resource Control (RRC) sublayer 306 in the layer 3 (L3). The RRC sublayer 306 is responsible for acquiring radio resources (i.e. radio bearer) and configuring the lower layers using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station device in the present disclosure.

In one embodiment, the first information in the present disclosure is generated by the RRC 306.

In one embodiment, the first signaling in the present disclosure is generated by the PHY 301.

In one embodiment, the second information in the present disclosure is generated by the RRC 306.

In one embodiment, the interleaving in the present disclosure is performed by the PHY 301.

Embodiment 4

Figure 4:
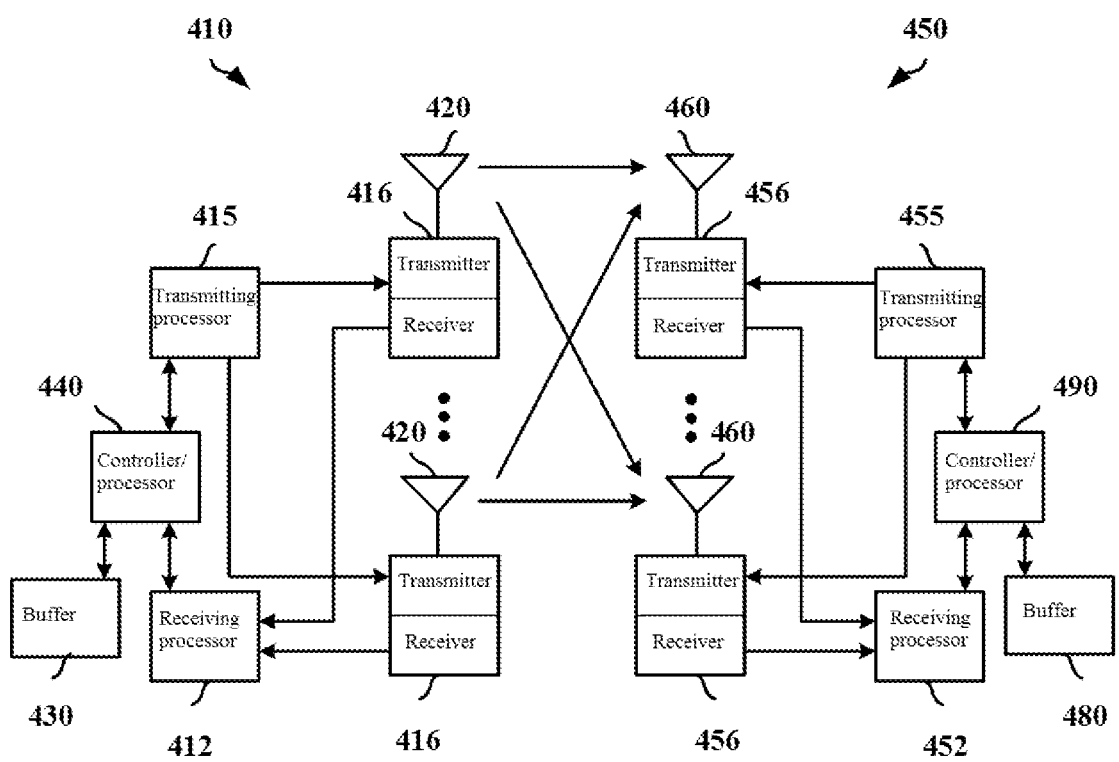
FIG. 4 is a diagram illustrating an evolved node B and a given UE according to one embodiment of the present disclosure.

Embodiment 4 illustrates a diagram of an evolved node B and a given UE according to the present disclosure, as shown in FIG. 4. FIG. 4 is a block diagram of a gNB 410 in communication with a UE 450 in an access network. In downlink transmission, a higher-layer packet coming from the core network is provided to a controller/processor 440. The controller/processor 440 provides functions of a layer 2. In downlink transmission, the controller/processor 440 provides header compression, encrypting, packet segmentation and reordering, multiplexing between a logical channel and a transport channel, and radio resource allocation for the UE 450 based on various priorities. The controller/processor 440 is also in charge of HARQ operation, retransmission of a lost packet, and a signaling to the UE 450. A transmitting processor 415 performs signal processing functions used for the layer 1 (that is, PHY). The signal processing function includes encoding and interleaving, so as to ensure an FEC (Forward Error Correction) and the mapping to corresponding signal clusters corresponding to each modulation scheme (i.e., BPSK, QPSK) at the UE 450 side. The encoded and modulated signals are divided into parallel streams. Each of the parallel streams is mapped into multi-carrier subcarriers and/or multi-carrier symbols, after the interleaving method of the present disclosure the modulated symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. The parallel streams subject to spatial precoding to generate multiple spatial streams. Each spatial stream is provided to different antennas 420 via the transmitter 416. Every transmitter 416 is used to transmit a corresponding spatial stream modulation RF (Radio Frequency) carrier. At the UE 450 side, every receiver 456 receives a signal via a corresponding antenna 460. Every receiver 456 recovers information modulated to the RF carrier and provides the information to a receiving processor 452. The receiving processor 452 performs signal receiving processing functions of the layer 1. The receiving processor 452 performs spatial processing on the information to recover any spatial stream targeting the UE 450. The receiving processor 452 then converts the multi-carrier symbol stream from time domain into frequency domain using FFT. A frequency domain signal includes a single multi-carrier symbol stream of each subcarrier used for multi-carrier signals. The symbol and reference signal on each subcarrier are recovered and demodulated by determining the most possible signal cluster point transmitted by the gNB 410, and generate a soft decision. The soft decision is then decoded and de-interleaved so as to recover the original data and control signal transmitted by the gNB 410 on the physical channel. The data and control signal are then provided to a controller/processor 490. The controller/processor 490 performs functions of the layer 2. The controller/processor can be connected to a memory 480 that stores program code and data. The memory 480 is a computer readable medium.

In one embodiment, the UE 450 includes at least one processor and at least one memory. The at least one memory includes computer program codes. The at least one memory and the computer program codes are configured to be used in collaboration with the at least one processor. The UE 450 at least receives first information and monitors a first signaling in M RE sets, wherein the first information is used for determining the M RE sets, a monitor of the first signaling assumes that P modulation symbol groups are one-to-one mapped to P RE sets, the P RE sets are P RE sets of the M RE sets, and one blind detection for the first signaling is performed on the P RE sets; modulation symbols obtained by modulating the bits in a first bit sequence constitute a first modulation symbol set sequentially, wherein the bits in the first bit sequence are sequentially arranged according to an output of a channel encoder; the first modulation symbol set is divided into the P modulation symbol groups successively from the front to the rear, and each modulation symbol group of the P modulation symbol groups consists of X modulation symbols; and relative positions of the P RE sets in frequency domain are related to at least one of {M, X}, wherein M is a positive integer, P is a positive integer not greater than M, and X is a positive integer.

In one embodiment, the UE 450 includes a memory that stores a computer readable instruction program. The computer readable instruction program generates an action when executed by at least one processor. The action includes:

receiving first information and monitoring a first signaling in M RE sets; wherein the first information is used for determining the M RE sets, a monitor of the first signaling assumes that P modulation symbol groups are one-to-one mapped to P RE sets, the P RE sets are P RE sets of the M RE sets, and one blind detection for the first signaling is performed on the P RE sets; modulation symbols obtained by modulating the bits in a first bit sequence constitute a first modulation symbol set sequentially, wherein the bits in the first bit sequence are sequentially arranged according to an output of a channel encoder; the first modulation symbol set is divided into the P modulation symbol groups successively from the front to the rear, and each modulation symbol group of the P modulation symbol groups consists of X modulation symbols; and relative positions of the P RE sets in frequency domain are related to at least one of {M, X}, wherein M is a positive integer, P is a positive integer not greater than M, and X is a positive integer.

In one embodiment, the gNB 410 includes at least one processor and at least one memory. The at least one memory includes computer program codes. The at least one memory and the computer program codes are configured to be used in collaboration with the at least one processor. The gNB 410 at least transmits first information and transmits a first signaling in M RE sets, wherein the first information is used for determining the M RE sets, a monitor of the first signaling assumes that P modulation symbol groups are one-to-one mapped to P RE sets, the P RE sets are P RE sets of the M RE sets, and one blind detection for the first signaling is performed on the P RE sets; modulation symbols obtained by modulating the bits in a first bit sequence constitute a first modulation symbol set sequentially, wherein the bits in the first bit sequence are sequentially arranged according to an output of a channel encoder; the first modulation symbol set is divided into the P modulation symbol groups successively from the front to the rear, and each modulation symbol group of the P modulation symbol groups consists of X modulation symbols; and relative positions of the P RE sets in frequency domain are related to at least one of {M, X}, wherein M is a positive integer, P is a positive integer not greater than M, and X is a positive integer.

In one embodiment, the gNB 410 includes a memory that stores a computer readable instruction program. The computer readable instruction program generates an action when executed by at least one processor. The action includes: transmitting first information and transmitting a first signaling in M RE sets, wherein the first information is used for determining the M RE sets, a monitor of the first signaling assumes that P modulation symbol groups are one-to-one mapped to P RE sets, the P RE sets are P RE sets of the M RE sets, and one blind detection for the first signaling is performed on the P RE sets; modulation symbols obtained by modulating the bits in a first bit sequence constitute a first modulation symbol set sequentially, wherein the bits in the first bit sequence are sequentially arranged according to an output of a channel encoder; the first modulation symbol set is divided into the P modulation symbol groups successively from the front to the rear, and each modulation symbol group of the P modulation symbol groups consists of X modulation symbols; and relative positions of the P RE sets in frequency domain are related to at least one of {M, X}, wherein M is a positive integer, P is a positive integer not greater than M, and X is a positive integer.

In one embodiment, the UE 450 corresponds to the UE in the present disclosure.

In one embodiment, the gNB 410 corresponds to the base station in the present disclosure.

In one embodiment, at least one of the receiving processor 452 and the controller/processor 490 is used for monitoring the first signaling in the present disclosure.

In one embodiment, the controller/processor 490 is used for receiving the first information in the present disclosure.

In one embodiment, the controller/processor 490 is used for receiving the second information in the present disclosure.

Embodiment 5

Figure 5:
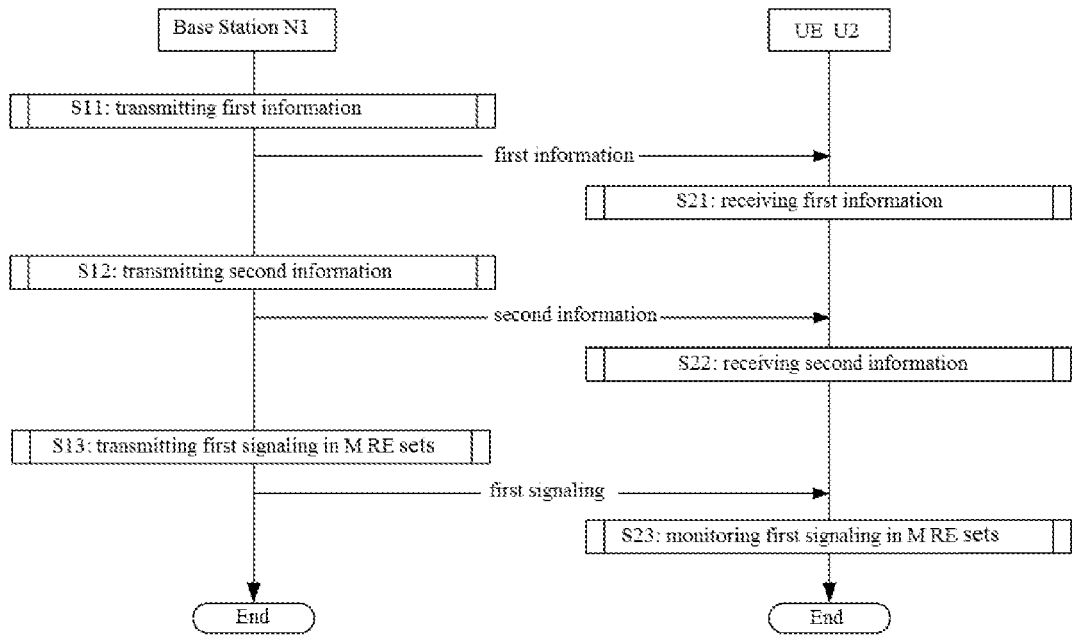
FIG. 5 is a flowchart illustrating the transmission of a radio signal according to one embodiment of the present disclosure.

Embodiment 5 illustrates an example of a flowchart of the transmission of a radio signal according to one embodiment of the present disclosure, as shown in FIG. 5. In FIG. 5, the base station N1 is a maintenance base station for a serving cell of the UE U2.

The base station N1 transmits first information in S11, transmits second information in S12, and transmits a first signaling in M RE sets in S13.

The UE U2 receives the first information in S21, receives the second information in S22, and receives the first signaling in the M RE sets in S23.

In embodiment 5, the first information is used for determining the M RE sets, a monitor of the first signaling assumes that P modulation symbol groups are one-to-one mapped to P RE sets, the P RE sets are P RE sets of the M RE sets, and one blind detection for the first signaling is performed on the P RE sets; modulation symbols obtained by modulating the bits in a first bit sequence constitute a first modulation symbol set sequentially, wherein the bits in the first bit sequence are sequentially arranged according to an output of a channel encoder; the first modulation symbol set is divided into the P modulation symbol groups successively from the front to the rear, and each modulation symbol group of the P modulation symbol groups consists of X modulation symbols; relative positions of the P RE sets in frequency domain are related to at least one of {M, X}, wherein M is a positive integer, P is a positive integer not greater than M, and X is a positive integer; and the second information is used for determining X.

In one embodiment, the second information is high-layer information.

In one embodiment, the second information is carried through an RRC signaling.

In one embodiment, the second information is one IE of the RRC signaling.

In one embodiment, the second information is physical layer information.

In one embodiment, the second information is transmitted through a DCI.

In one embodiment, the second information and the first information are transmitted as two IEs of one RRC signaling, respectively.

In one embodiment, the second information and the first information are transmitted as two fields of one RRC signaling, respectively.

In one embodiment, the second information is used by the UE to determine X.

In one embodiment, the second information indicates X.

Embodiment 6

Figure 6:
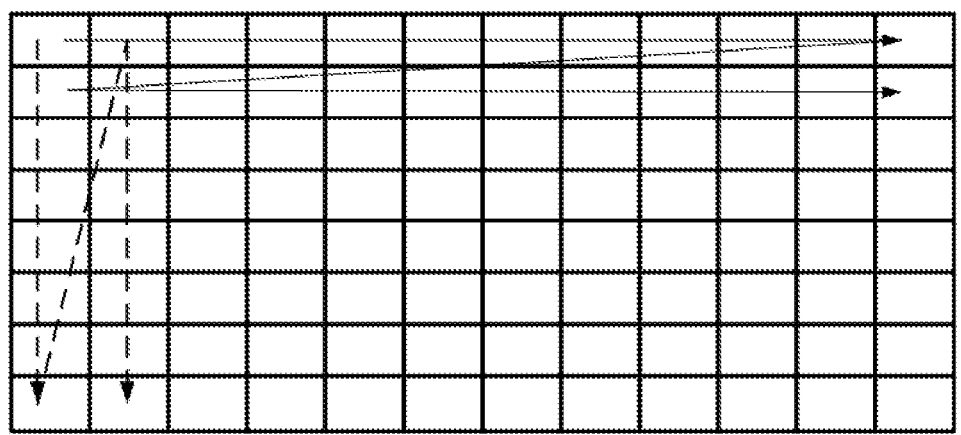
FIG. 6 is a diagram illustrating an interleaving operation according to one embodiment of the present disclosure.
Figure 6:
Figure 6:
Figure 6:

Embodiment 6 illustrates an example of a diagram of an interleaving operation according to one embodiment of the present disclosure, as shown in FIG. 6. In FIG. 6, each small rectangle represents one element in a target interleaving matrix; each element is placed with a modulation symbol group, and the modulation symbol group can be one of M modulation symbol groups, also can be one of J blank modulation symbol groups; the direction of the solid arrow represents the order of writing modulation symbol groups into the target interleaving matrix, and the direction of the dashed arrow represents the order of reading out M modulation symbol groups from the target matrix.

In Embodiment 6, the monitor of the first signaling assumes that the P modulation symbol groups are P consecutive groups of M modulation symbol groups sequentially arranged, the M modulation symbol groups sequentially arranged are interleaved and subsequently constitute a first symbol group sequence sequentially, and the modulation symbol groups in the first symbol group sequence are mapped, starting from a target RE set, to the M RE sets which are arranged in the order of frequency, wherein the target RE set is one of the M RE sets, and the interleaving includes the following:

the M modulation symbol groups sequentially arranged are mapped into a target interleaving matrix sequentially according to the order of rows first and then columns, as M matrix elements; and the elements in the target interleaving matrix are rearranged and then read out sequentially according to the order of columns first and then rows to obtain the first symbol group sequence.

Herein, each modulation symbol group of the P modulation symbol groups consists of X modulation symbols, at least one of {M, X} is used for determining the number of columns of the target interleaving matrix, the monitor of the first signaling assumes that the P modulation symbol groups are one-to-one mapped to P RE sets, and relative positions of the P RE sets in frequency domain are related to the number of columns of the target interleaving matrix.

In one embodiment, the number of columns of the target interleaving matrix is equal to M.

In one embodiment, the number of columns of the target interleaving matrix is equal to the quotient obtained when the product of M and X is divided by 72.

In one embodiment, the number of columns of the target interleaving matrix is equal to the quotient obtained when 72 is divided by X.

In one embodiment, the number of columns of the target interleaving matrix is equal to the smallest positive integral power of 2 that is not greater than M.

In one embodiment, the monitor of the first signaling assumes that each modulation symbol in the M modulation symbol groups and the modulation symbols in the P modulation symbol groups use the same modulation scheme.

In one embodiment, the target interleaving matrix is the transposition of an initial interleaving matrix, the interleaving can be regarded as a process in which the M modulation symbol groups which are sequentially arranged are arranged based on the initial interleaving matrix according to the order of columns first and then rows and then read out according to the order of rows first and then columns to obtain a first symbol group sequence.

In one embodiment, at least one of {M, X} determines the number of columns of the target interleaving matrix through a given corresponding relationship.

In one embodiment, at least one of {M, X} determines the number of columns of the target interleaving matrix by way of listing.

In one embodiment, at least one of {M, X} is used by the UE to determine the number of columns of the target interleaving matrix.

In one embodiment, the position of the target RE set in the M RE sets is fixed.

In one embodiment, the position of the target RE set in the M RE sets is changeable.

In one embodiment, the position of the target RE set in the M RE sets is predetermined.

In one embodiment, the position of the target RE set in the M RE sets is configurable.

In one embodiment, the position of the target RE set in the M RE sets is configured through a signaling the same as the first information.

Embodiment 7

Figure 7:
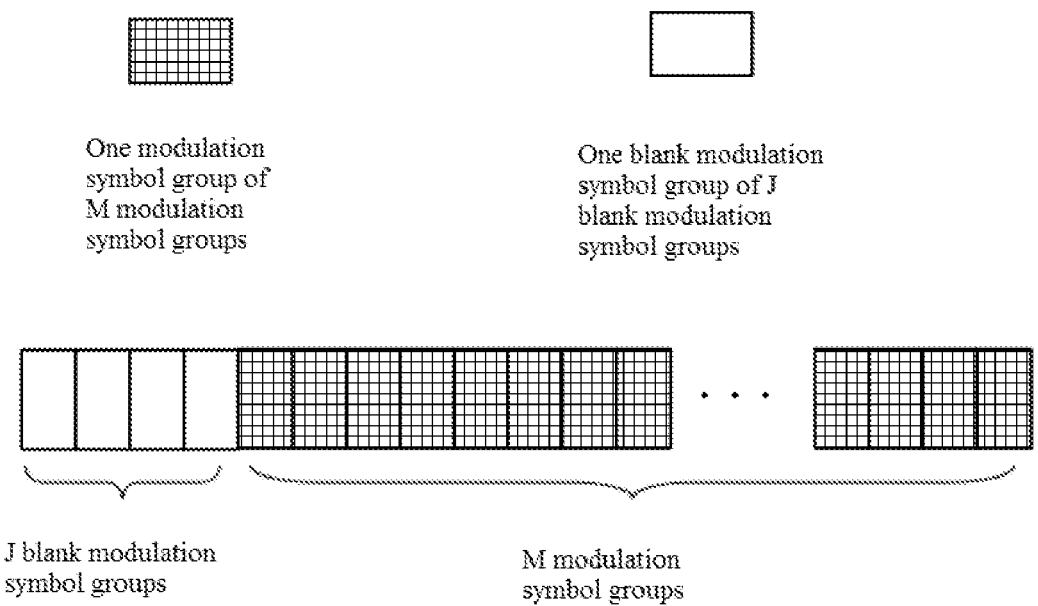
FIG. 7 is a diagram illustrating a relationship between M modulation symbol groups and J blank modulation symbol groups according to one embodiment of the present disclosure.

Embodiment 7 illustrates an example of a diagram of a relationship between M modulation symbol groups and J blank modulation symbol groups according to one embodiment of the present disclosure, as shown in FIG. 7. In FIG. 7, each blank rectangle represents one blank modulation symbol group of J blank modulation symbol groups, and each rectangle filled by cross lines represents one modulation symbol group of M modulation symbol groups.

In Embodiment 7, a target interleaving matrix includes R rows and C columns, M modulation symbol groups and J blank modulation symbol groups together are arranged into the target interleaving matrix, the sum of M and J is equal to the product of R and C, wherein R is a positive integer, C is a positive integer, and J is a non-negative integer.

In one embodiment, for a given value of C, R is the smallest positive integer that makes the product of R and C smaller than M.

In one embodiment, for a given value of R, C is the smallest positive integer that makes the product of R and C smaller than M.

In one embodiment, each modulation symbol in the J blank modulation symbol groups is NULL.

In one embodiment, the J blank modulation symbol groups are concatenated to the front of the M modulation symbol groups.

In one embodiment, the J blank modulation symbol groups are concatenated to the rear of the M modulation symbol groups.

In one embodiment, one blank modulation symbol group of the J blank modulation symbol groups is located between two modulation symbol groups of the M modulation symbol groups.

In one embodiment, the UE in the present disclosure assumes that the modulation symbols in the J blank modulation symbol groups are invalid.

In one embodiment, the UE in the present disclosure cannot make any assumption about the modulation symbols in the J blank modulation symbol groups.

Embodiment 8

Figure 8:
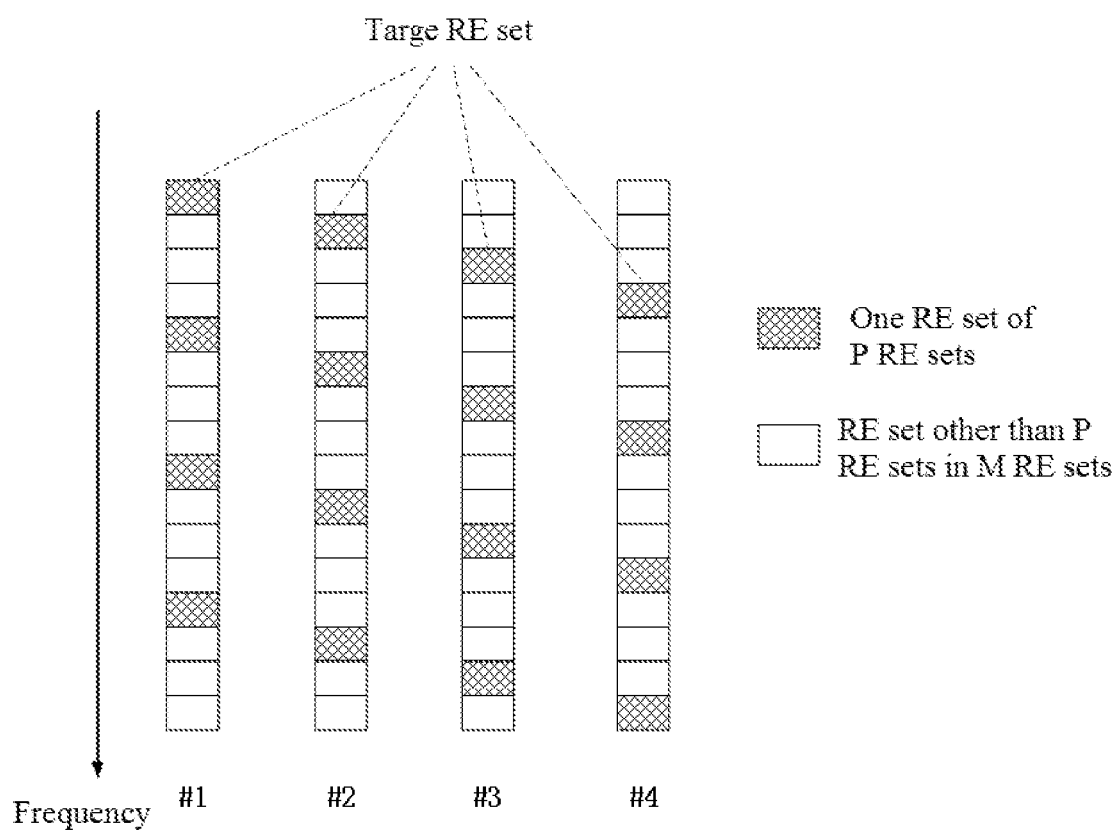
FIG. 8 is a diagram illustrating a target RE set according to one embodiment of the present disclosure.

Embodiment 8 illustrates an example of a diagram of a target RE set according to one embodiment of the present disclosure, as shown in FIG. 8. FIG. 8 shows four distributions (#1, #2, #3, #4) of P RE sets. The vertical axis represents frequency, each small rectangle filled by cross lines represents one RE set of P RE sets, each blank small rectangle represents one RE set other than the P RE sets in M RE sets, and each small rectangle filled by cross lines at the lowest frequency in each distribution represents a target RE set.

In Embodiment 8, the target RE set is related to at least one of {a feature ID of a transmitter of a first signaling, a feature ID of a monitor of the first signaling, a time-frequency position of an RE in the M RE sets}.

In one embodiment, the feature ID of the transmitter of the first signaling is a Physical Cell ID (PCID) of a cell transmitting the first signaling.

In one embodiment, the feature ID of the transmitter of the first signaling is an ID of a Transmit Reception Point (TRP) transmitting the first signaling.

In one embodiment, the feature ID of the transmitter of the first signaling is an ID of a base station transmitting the first signaling.

In one embodiment, the feature ID of the monitor of the first signaling is an RNTI of the UE.

In one embodiment, the time-frequency position of the RE in the M RE sets refers to an index of a multicarrier symbol occupied by one RE in the M RE sets.

In one embodiment, the time-frequency position of the RE in the M RE sets refers to an index of a subcarrier occupied by one RE in the M RE sets.

In one embodiment, the time-frequency position of the RE in the M RE sets refers to an index of a multicarrier symbol occupied by the RE of the lowest frequency in the M RE sets.

In one embodiment, the time-frequency position of the RE in the M RE sets refers to an index of a Physical Resource Block (PRB) occupied by the RE of the lowest frequency in the M RE sets.

In one embodiment, the time-frequency position of the RE in the M RE sets refers to an index of a Physical Resource Block (PRB) group occupied by the RE of the lowest frequency in the M RE sets, and the PRB group includes a positive integer number of PRBs which are consecutive in frequency domain.

In one embodiment, the time-frequency position of the RE in the M RE sets refers to an index of a multicarrier symbol occupied by the RE of the highest frequency in the M RE sets.

In one embodiment, the time-frequency position of the RE in the M RE sets refers to an index of a PRB occupied by the RE of the highest frequency in the M RE sets.

In one embodiment, the time-frequency position of the RE in the M RE sets refers to an index of a PRB group occupied by the RE of the highest frequency in the M RE sets, and the PRB group includes a positive integer number of PRBs which are consecutive in frequency domain.

In one embodiment, the time-frequency position of the RE in the M RE sets refers to an index of a multicarrier symbol occupied by one RE in the M RE sets.

In one embodiment, at least one of {the feature ID of the transmitter of the first signaling, the feature ID of the monitor of the first signaling, the time-frequency position of the RE in the M RE sets} is used to determine the target RE set.

In one embodiment, the target RE set is cyclically shifted in the M RE sets, and at least one of {the feature ID of the transmitter of the first signaling, the feature ID of the monitor of the first signaling, the time-frequency position of the RE in the M RE sets} is used to determine the position of the cyclic shift.

Embodiment 9

Figure 9:
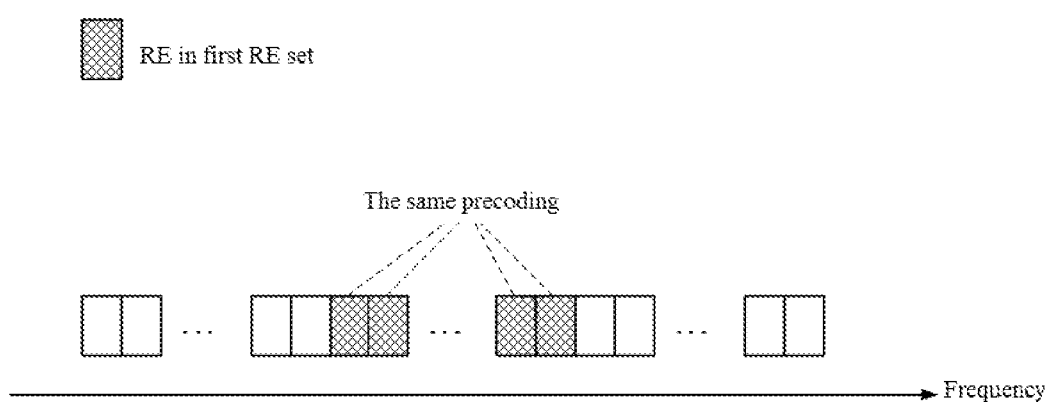
FIG. 9 is a diagram illustrating a first RE set according to one embodiment of the present disclosure.

Embodiment 9 illustrates an example of a diagram of a first RE set according to one embodiment of the present disclosure, as shown in FIG. 9. In FIG. 9, the horizontal axis represents frequency, each small rectangle filled by cross lines represents one RE in a first RE set, and each blank small rectangle represents one RE other than the first RE set.

In Embodiment 9, the first RE set is one of M RE sets, the monitor of the first signaling assumes that all REs in the first RE set adopt the same precoding, and the monitor of the first signaling cannot assume that the REs in the first RE set and the REs other than the first RE set both adopt the same precoding.

In one embodiment, the first RE set can be any one RE set of the M RE sets.

In one embodiment, all REs in the first RE set are transmitted through one same antenna port.

In one embodiment, two REs in the first RE set are transmitted through different antenna ports.

In one embodiment, the REs in the first RE set and a reference signal of the antenna port corresponding to the first RE set adopt the same precoding.

In one embodiment, the precoding is realized in digital domain.

In one embodiment, the precoding is realized in analog domain.

In one embodiment, the monitor of the first signaling assumes that one same channel estimation is applicable to all the REs in the first RE set, and the monitor of the first signaling cannot assume that one same channel estimation is applicable to both the REs in the first RE set and the REs other than the first RE set.

Embodiment 10

Figure 10:
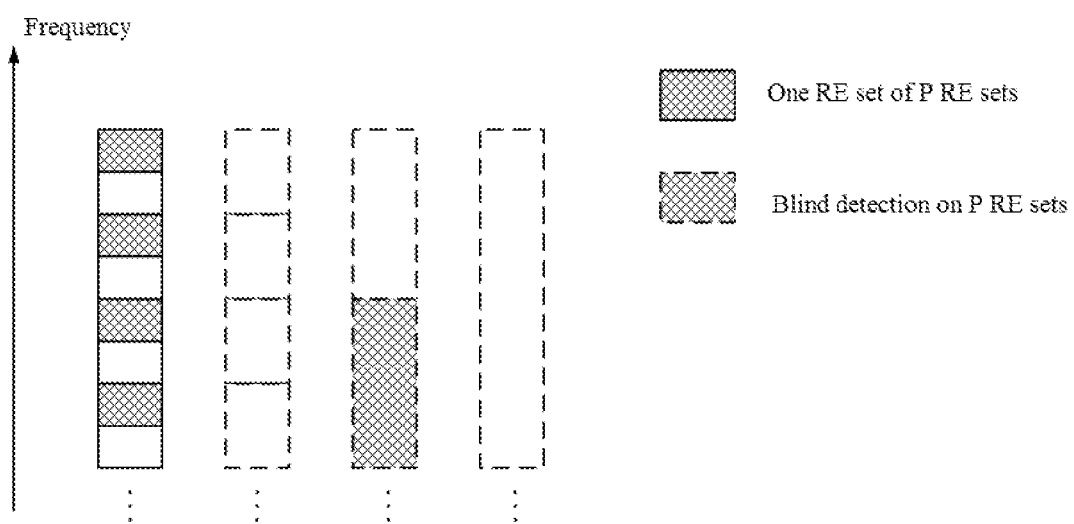
FIG. 10 is a diagram illustrating a blind detection on P RE sets according to one embodiment of the present disclosure.

Embodiment 10 illustrates an example of a diagram of a blind detection on P RE sets according to one embodiment of the present disclosure, as shown in FIG. 10. In FIG. 10, the vertical axis represents frequency, each small rectangle with a bold border represents an RE set, each small rectangle filled by cross lines with a bold border represents one RE set of P RE sets, each rectangle with a dashed border represents one blind detection of a first signaling, the rectangle filled by cross lines with a dashed border represents one blind detection of the first signaling on P RE sets.

In Embodiment 10, a maximum of Y detections are performed for the first signaling in the M RE sets, at least one detection of the Y detections is performed on the P RE sets, Y is a positive integer, and the first signaling is a physical layer signaling.

In one embodiment, each detection of the Y detections is realized through RNTI matching.

In one embodiment, any two detections of the Y detections are performed on different RE sets.

In one embodiment, two detections of the Y detections are performed on the same RE set.

In one embodiment, Y is related to the processing capability of the UE.

In one embodiment, only one detection of the Y detections is performed on the P RE sets.

Embodiment 11

Figure 11:
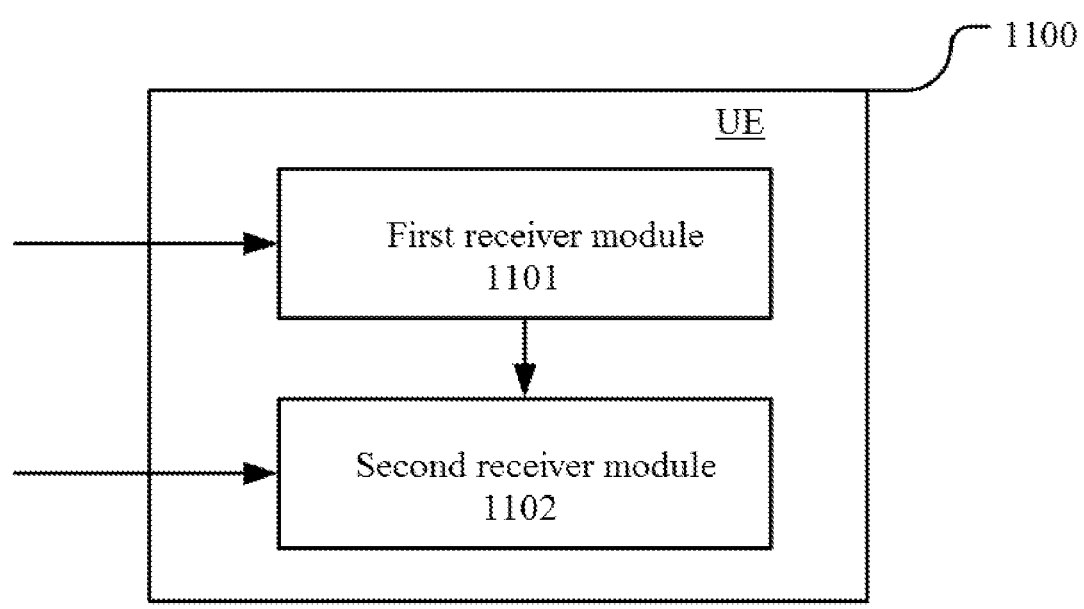
FIG. 11 is a structure block diagram illustrating a processing device in a UE according to one embodiment of the present disclosure.

Embodiment 11 illustrates an example of a structure block diagram of a processing device in a UE, as shown in FIG. 11. In FIG. 11, the UE processing device 1100 is mainly composed of a first receiver module 1101 and a second receiver module 1102. The first receiver module 1101 includes the transmitter/receiver 456 (including antenna 460), the receiving processor 452 and the controller/processor 490 shown in FIG. 4. The second receiver module 1102 includes the transmitter/receiver 456 (including antenna 460), the receiving processor 452 and the controller/processor 490 shown in FIG. 4.

In Embodiment 11, the first receiver module 1101 receives first information, and the second receiver module 1102 monitors a first signaling in M RE sets, wherein the first information is used for determining the M RE sets, a monitor of the first signaling assumes that P modulation symbol groups are one-to-one mapped to P RE sets, the P RE sets are P RE sets of the M RE sets, and one blind detection for the first signaling is performed on the P RE sets; modulation symbols obtained by modulating the bits in a first bit sequence constitute a first modulation symbol set sequentially, wherein the bits in the first bit sequence are sequentially arranged according to an output of a channel encoder; the first modulation symbol set is divided into the P modulation symbol groups successively from the front to the rear, and each modulation symbol group of the P modulation symbol groups consists of X modulation symbols; and relative positions of the P RE sets in frequency domain are related to at least one of {M, X}, wherein M is a positive integer, P is a positive integer not greater than M, and X is a positive integer.

In one embodiment, the monitor of the first signaling assumes that the P modulation symbol groups are P consecutive groups of M modulation symbol groups sequentially arranged, the M modulation symbol groups sequentially arranged are interleaved and subsequently constitute a first symbol group sequence sequentially, and the modulation symbol groups in the first symbol group sequence are mapped, starting from a target RE set, to the M RE sets which are arranged in the order of frequency, wherein the target RE set is one of the M RE sets, and the interleaving includes the following:

the M modulation symbol groups sequentially arranged are mapped into a target interleaving matrix sequentially according to the order of rows first and then columns, as M matrix elements; and the elements in the target interleaving matrix are rearranged and then read out sequentially according to the order of columns first and then rows to obtain the first symbol group sequence.

Herein, at least one of {M, X} is used for determining the number of columns of the target interleaving matrix, and relative positions of the P RE sets in frequency domain are related to the number of columns of the target interleaving matrix.

In one embodiment, the monitor of the first signaling assumes that the P modulation symbol groups are P consecutive groups of M modulation symbol groups which are sequentially arranged, the M modulation symbol groups which are sequentially arranged are interleaved to sequentially constitute a first symbol group sequence, and the modulation symbol groups in the first symbol group sequence are mapped, starting from a target RE set, to the M RE sets which are arranged in the order from high frequency to low frequency, wherein the target RE set is one of the M RE sets, and the interleaving includes the following processes:

the M modulation symbol groups which are sequentially arranged are arranged into a target interleaving matrix sequentially according to the order of rows first and then columns, as M matrix elements; and the elements in the target interleaving matrix are rearranged and then read out sequentially according to the order of columns first and then rows to obtain the first symbol group sequence.

Herein, at least one of {M, X} is used for determining the number of columns of the target interleaving matrix, and relative positions of the P RE sets in frequency domain are related to the number of columns of the target interleaving matrix; the target interleaving matrix includes R rows and C columns, the M modulation symbol groups and J blank modulation symbol groups together are arranged into the target interleaving matrix, the sum of M and J is equal to the product of R and C, wherein R is a positive integer, C is a positive integer, and J is a non-negative integer.

In one embodiment, the monitor of the first signaling assumes that the P modulation symbol groups are P consecutive groups of M modulation symbol groups sequentially arranged, the M modulation symbol groups sequentially arranged are interleaved and subsequently constitute a first symbol group sequence sequentially, and the modulation symbol groups in the first symbol group sequence are mapped, starting from a target RE set, to the M RE sets which are arranged in the order of frequency, wherein the target RE set is one of the M RE sets, and the interleaving includes the following:

the M modulation symbol groups which are sequentially arranged are arranged into a target interleaving matrix sequentially according to the order of rows first and then columns, as M matrix elements; and the elements in the target interleaving matrix are rearranged and then read out sequentially according to the order of columns first and then rows to obtain the first symbol group sequence.

Herein, at least one of {M, X} is used for determining the number of columns of the target interleaving matrix, and relative positions of the P RE sets in frequency domain are related to the number of columns of the target interleaving matrix; the target RE set is related to at least one of {a feature ID of a transmitter of the first signaling, a feature ID of the monitor of the first signaling, a time-frequency position of an RE in the M RE sets}.

In one embodiment, the monitor of the first signaling assumes that the P modulation symbol groups are P consecutive groups of M modulation symbol groups sequentially arranged, the M modulation symbol groups sequentially arranged are interleaved and subsequently constitute a first symbol group sequence sequentially, and the modulation symbol groups in the first symbol group sequence are mapped, starting from a target RE set, to the M RE sets which are arranged in the order of frequency, wherein the target RE set is one of the M RE sets, and the interleaving includes the following:

the M modulation symbol groups which are sequentially arranged are arranged into a target interleaving matrix sequentially according to the order of rows first and then columns, as M matrix elements; and the elements in the target interleaving matrix are rearranged and then read out sequentially according to the order of columns first and then rows to obtain the first symbol group sequence.

Herein, at least one of {M, X} is used for determining the number of columns of the target interleaving matrix, and relative positions of the P RE sets in frequency domain are related to the number of columns of the target interleaving matrix; the target interleaving matrix includes R rows and C columns, the M modulation symbol groups and J blank modulation symbol groups together are arranged into the target interleaving matrix, the sum of M and J is equal to the product of R and C, wherein R is a positive integer, C is a positive integer, and J is a non-negative integer; the target RE set is related to at least one of {a feature ID of a transmitter of the first signaling, a feature ID of the monitor of the first signaling, a time-frequency position of an RE in the M RE sets}.

In one embodiment, a first RE set is one of the M RE sets, the monitor of the first signaling assumes that all REs in the first RE set adopt the same precoding, and the monitor of the first signaling cannot assume that the REs in the first RE set and the REs other than the first RE set both adopt the same precoding.

In one embodiment, a maximum of Y detections are performed for the first signaling in the M RE sets, at least one detection of the Y detections is performed on the P RE sets, Y is a positive integer, and the first signaling is a physical layer signaling.

In one embodiment, the first receiver module 1101 further receives second information, and the second information is used for determining X.

Embodiment 12

Figure 12:
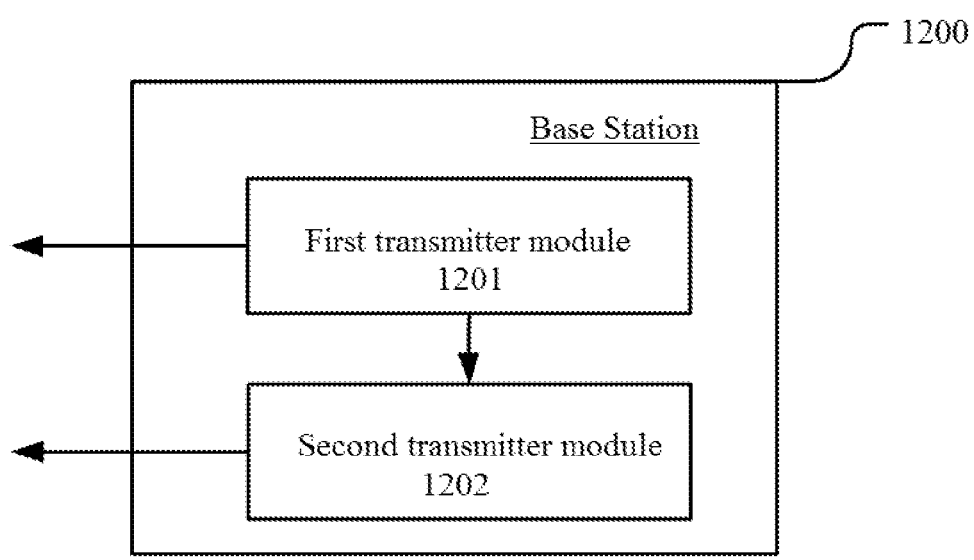
FIG. 12 is a structure block diagram illustrating a processing device in a base station according to one embodiment of the present disclosure.

Embodiment 12 illustrates an example of a structure block diagram of a processing device in a base station, as shown in FIG. 12. In FIG. 12, the processing device 1200 of the base station is mainly composed of a first transmitter module 1201 and a second transmitter module 1202. The first transmitter module 1201 includes the transmitter/receiver 416 (including antenna 420), the transmitting processor 415 and the controller/processor 440 shown in FIG. 4. The second transmitter module 1202 includes the transmitter/receiver 416 (including antenna 420), the transmitting processor 415 and the controller/processor 440 shown in FIG. 4.

In Embodiment 12, the first transmitter module 1201 transmits first information, and the second transmitter module 1202 transmits a first signaling in M RE sets, wherein the first information is used for determining the M RE sets, a monitor of the first signaling assumes that P modulation symbol groups are one-to-one mapped to P RE sets, the P RE sets are P RE sets of the M RE sets, and one blind detection for the first signaling is performed on the P RE sets; modulation symbols obtained by modulating the bits in a first bit sequence constitute a first modulation symbol set sequentially, wherein the bits in the first bit sequence are sequentially arranged according to an output of a channel encoder; the first modulation symbol set is divided into the P modulation symbol groups successively from the front to the rear, and each modulation symbol group of the P modulation symbol groups consists of X modulation symbols; and relative positions of the P RE sets in frequency domain are related to at least one of {M, X}, wherein M is a positive integer, P is a positive integer not greater than M, and X is a positive integer.

In one embodiment, the monitor of the first signaling assumes that the P modulation symbol groups are P consecutive groups of M modulation symbol groups sequentially arranged, the M modulation symbol groups sequentially arranged are interleaved and subsequently constitute a first symbol group sequence sequentially, and the modulation symbol groups in the first symbol group sequence are mapped, starting from a target RE set, to the M RE sets which are arranged in the order of frequency, wherein the target RE set is one of the M RE sets, and the interleaving includes the following:

the M modulation symbol groups sequentially arranged are mapped into a target interleaving matrix sequentially according to the order of rows first and then columns, as M matrix elements; and the elements in the target interleaving matrix are rearranged and then read out sequentially according to the order of columns first and then rows to obtain the first symbol group sequence.

Herein, at least one of {M, X} is used for determining the number of columns of the target interleaving matrix, and relative positions of the P RE sets in frequency domain are related to the number of columns of the target interleaving matrix.

In one embodiment, the monitor of the first signaling assumes that the P modulation symbol groups are P consecutive groups of M modulation symbol groups sequentially arranged, the M modulation symbol groups sequentially arranged are interleaved and subsequently constitute a first symbol group sequence, and the modulation symbol groups in the first symbol group sequence are mapped, starting from a target RE set, to the M RE sets which are arranged in the order of frequency, wherein the target RE set is one of the M RE sets, and the interleaving includes the following:

the M modulation symbol groups sequentially arranged are mapped into a target interleaving matrix sequentially according to the order of rows first and then columns, as M matrix elements; and the elements in the target interleaving matrix are rearranged and then read out sequentially according to the order of columns first and then rows to obtain the first symbol group sequence.

Herein, at least one of {M, X} is used for determining the number of columns of the target interleaving matrix, and relative positions of the P RE sets in frequency domain are related to the number of columns of the target interleaving matrix; the target interleaving matrix includes R rows and C columns, the M modulation symbol groups and J blank modulation symbol groups together are arranged into the target interleaving matrix, the sum of M and J is equal to the product of R and C, wherein R is a positive integer, C is a positive integer, and J is a non-negative integer.

In one embodiment, the monitor of the first signaling assumes that the P modulation symbol groups are P consecutive groups of M modulation symbol groups sequentially arranged, the M modulation symbol groups sequentially arranged are interleaved and subsequently constitute a first symbol group sequence sequentially, and the modulation symbol groups in the first symbol group sequence are mapped, starting from a target RE set, to the M RE sets which are arranged in the order of frequency, wherein the target RE set is one of the M RE sets, and the interleaving includes the following:

the M modulation symbol groups which are sequentially arranged are arranged into a target interleaving matrix sequentially according to the order of rows first and then columns, as M matrix elements; and the elements in the target interleaving matrix are rearranged and then read out sequentially according to the order of columns first and then rows to obtain the first symbol group sequence.

Herein, at least one of {M, X} is used for determining the number of columns of the target interleaving matrix, and relative positions of the P RE sets in frequency domain are related to the number of columns of the target interleaving matrix; the target RE set is related to at least one of {a feature ID of a transmitter of the first signaling, a feature ID of the monitor of the first signaling, a time-frequency position of an RE in the M RE sets}.

In one embodiment, the monitor of the first signaling assumes that the P modulation symbol groups are P consecutive groups of M modulation symbol groups sequentially arranged, the M modulation symbol groups sequentially arranged are interleaved and subsequently constitute a first symbol group sequence sequentially, and the modulation symbol groups in the first symbol group sequence are mapped, starting from a target RE set, to the M RE sets which are arranged in the order of frequency, wherein the target RE set is one of the M RE sets, and the interleaving includes the following:

the M modulation symbol groups which are sequentially arranged are arranged into a target interleaving matrix sequentially according to the order of rows first and then columns, as M matrix elements; and the elements in the target interleaving matrix are rearranged and then read out sequentially according to the order of columns first and then rows to obtain the first symbol group sequence.

Herein, at least one of {M, X} is used for determining the number of columns of the target interleaving matrix, and relative positions of the P RE sets in frequency domain are related to the number of columns of the target interleaving matrix; the target interleaving matrix includes R rows and C columns, the M modulation symbol groups and J blank modulation symbol groups together are arranged into the target interleaving matrix, the sum of M and J is equal to the product of R and C, wherein R is a positive integer, C is a positive integer, and J is a non-negative integer; the target RE set is related to at least one of {a feature ID of a transmitter of the first signaling, a feature ID of the monitor of the first signaling, a time-frequency position of an RE in the M RE sets}.

In one embodiment, a first RE set is one of the M RE sets, the monitor of the first signaling assumes that all REs in the first RE set adopt the same precoding, and the monitor of the first signaling cannot assume that the REs in the first RE set and the REs other than the first RE set both adopt the same precoding.

In one embodiment, a maximum of Y detections are performed for the first signaling in the M RE sets, at least one detection of the Y detections is performed on the P RE sets, Y is a positive integer, and the first signaling is a physical layer signaling.

In one embodiment, the first transmitter module 1201 further transmits second information, and the second information is used for determining X.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE or terminal in the present disclosure includes but not limited to mobile phones, tablet computers, notebooks, network cards, low-power equipment, enhanced MTC (eMTC) equipment, NB-IoT equipment, vehicle-mounted communication equipment, and other wireless communication equipment. The base station or network side equipment in the present application includes but not limited to macro-cellular base stations, micro-cellular base stations, home base stations, relay base station, eNB, gNB, TRP, and other wireless communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communication, comprising:
   receiving first information from a base station device; and
   monitoring a first signaling in M Resource Element (RE) sets, the first signaling being transmitted by the base station device;
   wherein:
   the first information is used by the UE for determining the M RE sets, the monitoring of the first signaling assumes that P modulation symbol groups are one-to-one mapped to P RE sets, the P RE sets are P RE sets of the M RE sets, and one blind detection for the first signaling is performed on the P RE sets;
   the bits in a first bit sequence of the first signaling have been modulated by the base station device to obtain modulation symbols that constitute a first modulation symbol set sequentially, wherein the bits in the first bit sequence are sequentially arranged according to an output of a channel encoder;
   the first modulation symbol set is divided into the P modulation symbol groups successively from the front to the rear, and each modulation symbol group of the P modulation symbol groups consists of X modulation symbols; and
   relative positions of the P RE sets in the frequency domain are related to at least one of {M, X}, wherein M is a positive integer, P is a positive integer not greater than M, and X is a positive integer.

2. The method according to claim 1, wherein the monitor of the first signaling assumes that the P modulation symbol groups are P consecutive groups of M modulation symbol groups sequentially arranged, the M modulation symbol groups sequentially arranged are interleaved and subsequently constitute a first symbol group sequence sequentially, and the modulation symbol groups in the first symbol group sequence are mapped, starting from a target RE set, to the M RE sets which are arranged in the order of frequency, wherein the target RE set is one of the M RE sets, and the interleaving comprises the following:
   the M modulation symbol groups sequentially arranged are mapped into a target interleaving matrix sequentially according to the order of rows first and then columns, as M matrix elements; and
   the elements in the target interleaving matrix are rearranged and then read out sequentially according to the order of columns first and then rows to obtain the first symbol group sequence; wherein at least one of {M, X} is used for determining the number of columns of the target interleaving matrix, and relative positions of the P RE sets in frequency domain are related to the number of columns of the target interleaving matrix.

3. The method according to claim 2, wherein the target RE set is related to at least one of {a feature ID of a transmitter of the first signaling, a feature ID of the monitor of the first signaling, a time-frequency position of an RE in the M RE sets}.

4. The method according to claim 1, wherein a first RE set is one of the M RE sets, the monitor of the first signaling assumes that all REs in the first RE set adopt the same precoding, and the monitor of the first signaling cannot assume that the REs in the first RE set and the REs other than the first RE set both adopt the same precoding; or a maximum of Y detections are performed for the first signaling in the M RE sets, at least one detection of the Y detections is performed on the P RE sets, Y is a positive integer, and the first signaling is a physical layer signaling.

5. The method according to claim 1, further comprising:
receiving second information;
wherein the second information is used for determining X.

6. A method in a base station device for wireless communication, comprising:
transmitting first information to a User Equipment (UE); and
transmitting, to the UE, a first signaling in M RE sets;
wherein:
the first information is used by the UE for determining the M RE sets, a monitoring of the first signaling by the UE assumes that P modulation symbol groups are one-to-one mapped to P RE sets, the P RE sets are P RE sets of the M RE sets, and one blind detection for the first signaling is performed on the P RE sets;
the bits in a first bit sequence of the first signaling are modulated by the base station device to obtain modulation symbols that constitute a first modulation symbol set sequentially, wherein the bits in the first bit sequence are sequentially arranged according to an output of a channel encoder;
the first modulation symbol set is divided into the P modulation symbol groups successively from the front to the rear, and each modulation symbol group of the P modulation symbol groups consists of X modulation symbols; and
relative positions of the P RE sets in the frequency domain are related to at least one of {M, X}, wherein M is a positive integer, P is a positive integer not greater than M, and X is a positive integer.

7. The method according to claim 6, wherein the monitor of the first signaling assumes that the P modulation symbol groups are P consecutive groups of M modulation symbol groups sequentially arranged, the M modulation symbol groups sequentially arranged are interleaved and subsequently constitute a first symbol group sequence sequentially, and the modulation symbol groups in the first symbol group sequence are mapped, starting from a target RE set, to the M RE sets which are arranged in the order of frequency, wherein the target RE set is one of the M RE sets, and the interleaving comprises the following:
the M modulation symbol groups sequentially arranged are mapped into a target interleaving matrix sequentially according to the order of rows first and then columns, as M matrix elements; and
the elements in the target interleaving matrix are rearranged and then read out sequentially according to the order of columns first and then rows to obtain the first symbol group sequence;
wherein at least one of {M, X} is used for determining the number of columns of the target interleaving matrix, and relative positions of the P RE sets in frequency domain are related to the number of columns of the target interleaving matrix.

8. The method according to claim 7, wherein the target RE set is related to at least one of {a feature ID of a transmitter of the first signaling, a feature ID of the monitor of the first signaling, a time-frequency position of an RE in the M RE sets}.

9. The method according to claim 6, wherein a first RE set is one of the M RE sets, the monitor of the first signaling assumes that all REs in the first RE set adopt the same precoding, and the monitor of the first signaling cannot assume that the REs in the first RE set and the REs other than the first RE set both adopt the same precoding; or a maximum of Y detections are performed for the first signaling in the M RE sets, at least one detection of the Y detections is performed on the P RE sets, Y is a positive integer, and the first signaling is a physical layer signaling.

10. The method according to claim 6, further comprising:
transmitting second information;
wherein the second information is used for determining X.

11. A User Equipment (UE) for wireless communication, comprising:
hardware including a processing system and one or more antennas, the hardware being configured to perform operations comprising:
receiving first information; and
monitoring a first signaling in M RE sets;
wherein:
the first information is used by the UE for determining the M RE sets, the monitoring of the first signaling assumes that P modulation symbol groups are one-to-one mapped to P RE sets, the P RE sets are P RE sets of the M RE sets, and one blind detection for the first signaling is performed on the P RE sets;
the bits in a first bit sequence of the first signaling have been modulated by the base station device to obtain modulation symbols that constitute a first modulation symbol set sequentially, wherein the bits in the first bit sequence are sequentially arranged according to an output of a channel encoder;
the first modulation symbol set is divided into the P modulation symbol groups successively from the front to the rear, and each modulation symbol group of the P modulation symbol groups consists of X modulation symbols; and
relative positions of the P RE sets in the frequency domain are related to at least one of {M, X}, wherein M is a positive integer, P is a positive integer not greater than M, and X is a positive integer.

12. The UE according to claim 11, wherein the monitor of the first signaling assumes that the P modulation symbol groups are P consecutive groups of M modulation symbol groups sequentially arranged, the M modulation symbol groups sequentially arranged are interleaved and subsequently constitute a first symbol group sequence sequentially, and the modulation symbol groups in the first symbol group sequence are mapped, starting from a target RE set, to the M RE sets which are arranged in the order of frequency, wherein the target RE set is one of the M RE sets, and the interleaving comprises the following:
the M modulation symbol groups sequentially arranged are mapped into a target interleaving matrix sequentially according to the order of rows first and then columns, as M matrix elements; and the elements in the target interleaving matrix are rearranged and then read out sequentially according to the order of columns first and then rows to obtain the first symbol group sequence;

wherein at least one of {M, X} is used for determining the number of columns of the target interleaving matrix, and relative positions of the P RE sets in frequency domain are related to the number of columns of the target interleaving matrix.

13. The UE according to claim 12, wherein the target RE set is related to at least one of {a feature ID of a transmitter of the first signaling, a feature ID of the monitor of the first signaling, a time-frequency position of an RE in the M RE sets}.

14. The UE according to claim 11, wherein a first RE set is one of the M RE sets, the monitor of the first signaling assumes that all REs in the first RE set adopt the same precoding, and the monitor of the first signaling cannot assume that the REs in the first RE set and the REs other than the first RE set both adopt the same precoding; or a maximum of Y detections are performed for the first signaling in the M RE sets, at least one detection of the Y detections is performed on the P RE sets, Y is a positive integer, and the first signaling is a physical layer signaling.

15. The UE according to claim 11, wherein the operations further comprise receiving second information, and the second information is used for determining X.

16. A base station device for wireless communication, comprising:
   transmitting first information; and
   transmitting a first signaling in M RE sets;
   wherein:
      the first information is used by the UE for determining the M RE sets, a monitoring of the first signaling by the UE assumes that P modulation symbol groups are one-to-one mapped to P RE sets, the P RE sets are P RE sets of the M RE sets, and one blind detection for the first signaling is performed on the P RE sets;
      the bits in a first bit sequence of the first signaling are modulated by the base station device to obtain modulation symbols that constitute a first modulation symbol set sequentially, wherein the bits in the first bit sequence are sequentially arranged according to an output of a channel encoder;
      the first modulation symbol set is divided into the P modulation symbol groups successively from the front to the rear, and each modulation symbol group of the P modulation symbol groups consists of X modulation symbols; and
      relative positions of the P RE sets in the frequency domain are related to at least one of {M, X}, wherein M is a positive integer, P is a positive integer not greater than M, and X is a positive integer.

17. The base station device according to claim 16, wherein the monitor of the first signaling assumes that the P modulation symbol groups are P consecutive groups of M modulation symbol groups sequentially arranged, the M modulation symbol groups sequentially arranged are interleaved and subsequently constitute a first symbol group sequence sequentially, and the modulation symbol groups in the first symbol group sequence are mapped, starting from a target RE set, to the M RE sets which are arranged in the order of frequency, wherein the target RE set is one of the M RE sets, and the interleaving comprises the following processes:
   the M modulation symbol groups sequentially arranged are mapped into a target interleaving matrix sequentially according to the order of rows first and then columns, as M matrix elements; and
   the elements in the target interleaving matrix are rearranged and then read out sequentially according to the order of columns first and then rows to obtain the first symbol group sequence;
   wherein at least one of {M, X} is used for determining the number of columns of the target interleaving matrix, and relative positions of the P RE sets in frequency domain are related to the number of columns of the target interleaving matrix.

18. The base station device according to claim 17, wherein the target RE set is related to at least one of {a feature ID of a transmitter of the first signaling, a feature ID of the monitor of the first signaling, a time-frequency position of an RE in the M RE sets}.

19. The base station device according to claim 16, wherein a first RE set is one of the M RE sets, the monitor of the first signaling assumes that all REs in the first RE set adopt the same precoding, and the monitor of the first signaling cannot assume that the REs in the first RE set and the REs other than the first RE set both adopt the same precoding; or a maximum of Y detections are performed for the first signaling in the M RE sets, at least one detection of the Y detections is performed on the P RE sets, Y is a positive integer, and the first signaling is a physical layer signaling.

20. The base station device according to claim 16, wherein the operations further comprise transmitting second information, and the second information is used for determining X.

* * * * *